(12) United States Patent
Ercolano

(10) Patent No.: US 8,336,841 B2
(45) Date of Patent: Dec. 25, 2012

(54) COMPACT CUP HOLDER WITH RETRACTABLE FRONT

(75) Inventor: Tony Ercolano, Wavignies (FR)

(73) Assignee: Faurecia Interieur Industrie, Nanterre (FR)

( * ) Notice: Subject to any disclaimer, the term of this patent is extended or adjusted under 35 U.S.C. 154(b) by 75 days.

(21) Appl. No.: 12/744,992

(22) PCT Filed: Nov. 27, 2008

(86) PCT No.: PCT/FR2008/052138
§ 371 (c)(1),
(2), (4) Date: May 27, 2010

(87) PCT Pub. No.: WO2009/071846
PCT Pub. Date: Jun. 11, 2009

(65) Prior Publication Data
US 2010/0276465 A1    Nov. 4, 2010

(30) Foreign Application Priority Data

Nov. 29, 2007    (FR) ...................................... 07 59438

(51) Int. Cl.
*A47K 1/08*    (2006.01)
(52) U.S. Cl. ...................... 248/311.2; 224/926; 224/281; 220/737
(58) Field of Classification Search ............... 248/311.2, 248/312, 312.1; 224/926, 282, 281; 220/629, 220/628, 737
See application file for complete search history.

(56) References Cited

U.S. PATENT DOCUMENTS

| | | | | |
|---|---|---|---|---|
| 4,892,281 A | * | 1/1990 | DiFilippo et al. | 248/311.2 |
| 4,981,277 A | | 1/1991 | Elwell | |
| 5,297,767 A | * | 3/1994 | Miller et al. | 248/311.2 |
| 5,628,486 A | | 5/1997 | Rossman et al. | |
| 5,692,658 A | * | 12/1997 | Fischer et al. | 224/281 |
| 5,692,718 A | * | 12/1997 | Bieck | 248/311.2 |
| 5,876,007 A | * | 3/1999 | Lancaster et al. | 248/311.2 |
| 6,450,468 B1 | | 9/2002 | Hamamoto | |
| 6,779,769 B1 | * | 8/2004 | York et al. | 248/311.2 |
| D512,679 S | * | 12/2005 | Fraser et al. | D12/419 |
| D593,930 S | * | 6/2009 | Fossett | D12/420 |

FOREIGN PATENT DOCUMENTS

GB            2379203 A        8/2003

OTHER PUBLICATIONS

International Search Report dated May 20, 2009, from corresponding PCT application.

* cited by examiner

*Primary Examiner* — Alfred J Wujciak
(74) *Attorney, Agent, or Firm* — Young & Thompson

(57) ABSTRACT

A cup holder (1) for receiving a vessel (6) includes a drawer (2) capable of sliding inside a body (3) so as to move identically between a closed position and an open position. The drawer (2) locally includes an outer outline (9) in the shape of an open arc of a circle that engages a partial perimeter (C1) of the vessel (6). The cup holder further includes a stowable front (4) that is flush with a side of the drawer (2) when the drawer (2) is in the closed position, and that is in an inclined position relative to the drawer (2) when the drawer (2) is in the open position in order to hold the base of the vessel (6).

17 Claims, 2 Drawing Sheets

COMPACT CUP HOLDER WITH RETRACTABLE FRONT

The present invention relates to a compact cup holder with a retractable front. In particular, an object of the invention is to limit the spatial requirement in terms of the length of such a device. The invention can be used in a particularly advantageous manner, but not exclusively, with cup holders which are intended to be fitted inside a central zone of a dashboard of a motor vehicle.

BACKGROUND OF THE INVENTION

The term cup is intended to refer to a drinking receptacle which is cylindrical or slightly widened, generally without a handle and without a stand. However, the cup holder according to the invention is capable of receiving receptacles of any shape which may or may not be provided with a handle or a stand.

Cup holders 1 are known, as illustrated in section in FIG. 1, comprising a drawer 2 which is capable of sliding inside a body 3 so as to move from a closed position in which the drawer 2 is retracted inside the body to an open position in which the drawer 2 is at least partially extended from the body 3 in order to receive a receptacle. Furthermore, a substantially planar front 4 which forms an angle with the extension plane of the drawer 2 provides the finishing of the cup holder.

In an open position, the drawer 2 has a portion 2.1 which has a length L1 in the state extended from the drawer which receives the receptacle and a portion 2.2 which has a length L2 and which is engaged inside the body 3.

The extended portion 2.1 must be sufficiently long to receive cups of any size. It generally has a length L1 of approximately 150 mm whilst the engaged portion 2.2 must be sufficiently large to limit overhang between the portions 2.1 and 2.2 and therefore has a minimum length L2 of approximately 40 mm. Since the length of the body 3 is substantially equal to the total of the lengths L1 and L2, it is a minimum of 190 mm.

Current vehicles do not have a space with a sufficient length in the central zones 8 of the dashboards to receive cup holders of this length. The space available in terms of the depth of the central zones 8 is very limited owing to the numerous architecture elements, such as electrical cables, which extend through this zone and prevent the introduction of cup holders.

SUMMARY OF THE INVENTION

The invention proposes in particular limiting the length of the cup holder in order to facilitate the introduction thereof in the central zones of dashboards.

To this end, a partial imprint of the cup holder (for example, a semi-imprint) is created so that the drawer locally has an outer contour in the form of an open circular arc which is intended to be in contact with a partial circumference of the receptacle.

Furthermore, the front retracts, for example, by means of articulated arms, so that, when the cup holder is in a closed position, the front is flush with one side of the drawer and, when the cup holder is in the open position, the front is inclined and acts as a support at the base of the holder.

In this manner, with a drawer which is approximately half the length of that of a conventional cup holder, the cup holder according to the invention allows cups to be received which are the same size as those received by existing cup holders and allows a compact body of reduced size to be produced. A cup holder according to the invention has a length of approximately 130 mm, as opposed to 190 mm for existing cup holders.

Furthermore, the cup holder according to the invention comprises a retractable articulated retention arm which is intended to extend around the cup. This retention arm which is, for example, C-shaped, allows the cup holder to be adapted to different cup sizes.

The invention therefore relates to a cup holder which is intended to receive a receptacle of the cup type, this cup holder comprising a drawer and a hollow body, the drawer being capable of sliding inside the body in a movement direction in order to move from a closed position in which the drawer is retracted inside the body to an open position in which the drawer is at least partially extended from the body in order to receive the receptacle, and a front which is connected to the drawer, this front being flush with a side of the drawer when the drawer is in a closed position, characterised in that:

the drawer locally has an outer contour in the form of an open circular arc which is intended to come into contact with a partial perimeter of the receptacle, and in that the front is retractable, this front comprising means for becoming located in an inclined position relative to the drawer when the drawer is in an open position in order to support the base of the receptacle.

According to one embodiment, the extension travel of the drawer is less than the diameter of the smallest cup which can be received.

According to one embodiment, the cup holder further comprises a retention arm which can be rotatably moved relative to the drawer about an axis perpendicular relative to the plane in which the drawer extends in order to adapt the cup holder to the diameter of the receptacle to be carried.

According to one embodiment, the retention arm substantially has a C-shape which complements the outer contour of the receptacle.

According to one embodiment, the front comprises at least one connection arm which connects the front to the drawer, this connection arm being rotatably movable relative to the drawer about an axis which is located in the plane of the drawer and which is perpendicular relative to the movement direction of the drawer.

According to one embodiment, the front comprises two connection arms, these two connection arms each having an end which is connected to the front and an end which is connected to one of the sides of the drawer extending in the movement direction.

According to one embodiment, the front has a surface which is inclined relative to the extension surface of the front so that the base of the receptacle rests in a flat state on the front.

According to one embodiment, the inclination angle of the surface corresponds to the inclination angle of the connection arm relative to the drawer when the drawer is in the open position.

According to one embodiment, the contour of the drawer has a semi-circular shape.

BRIEF DESCRIPTION OF THE DRAWINGS

The invention will be better understood from a reading of the following description and an examination of the accompanying Figures. These Figures are given purely by way of non-limiting example of the invention. In the Figures.

DETAILED DESCRIPTION OF THE PREFERRED EMBODIMENTS

Figure 1:
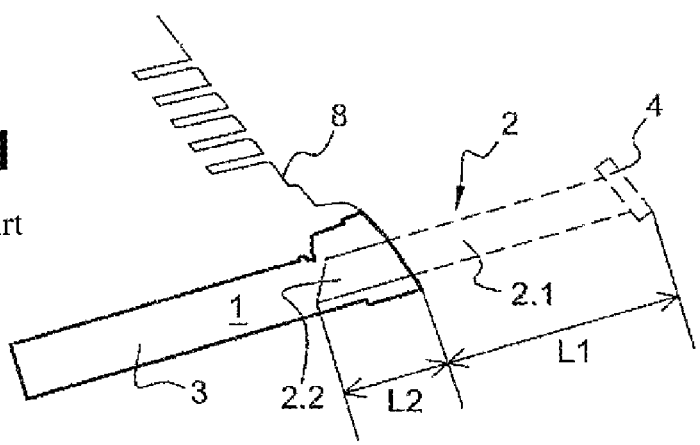
FIG. 1 (already described) is a sectional view of a cup holder according to the prior art in the open position.

Elements which are the same have the same reference numeral from one Figure to the next.

Figure 2A:
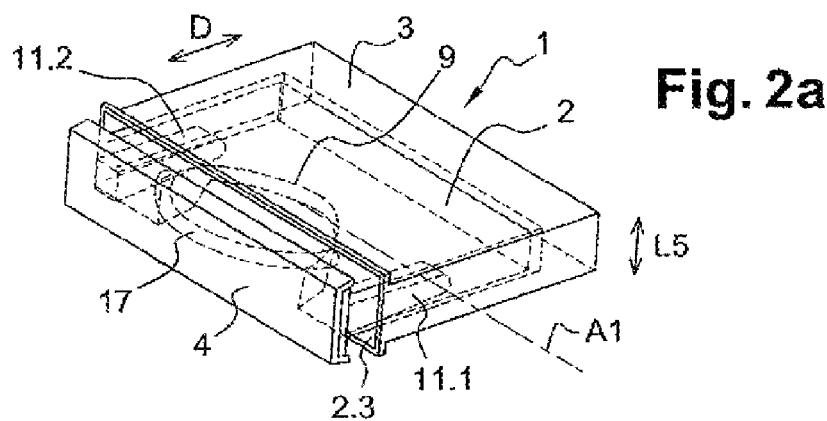
FIGS. 2a and 2b are a three-dimensional view and a top view of the hidden edges of a cup holder according to the invention in the closed position, respectively.
Figure 2B:
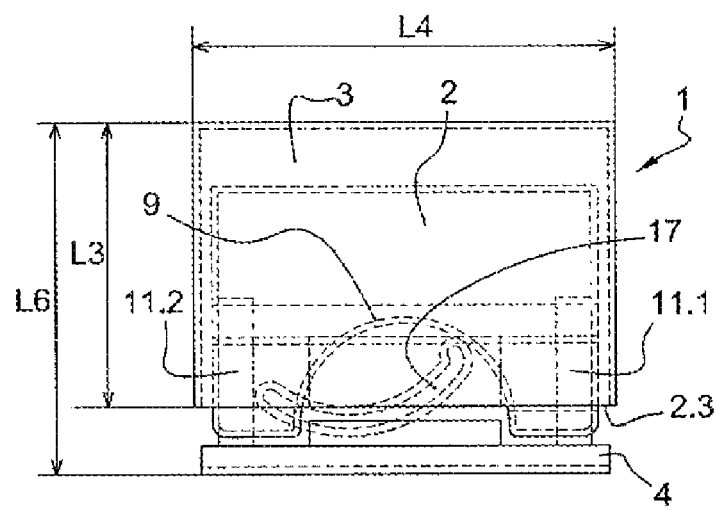
Figure 3A:
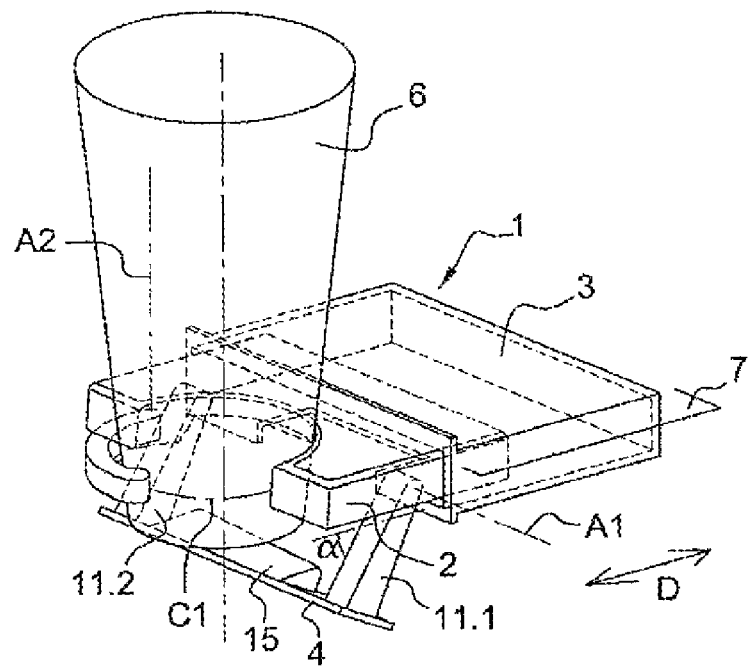
FIGS. 3a and 3b are a three-dimensional view and a top view of the hidden edges of a cup holder according to the invention in an open position.
Figure 3B:
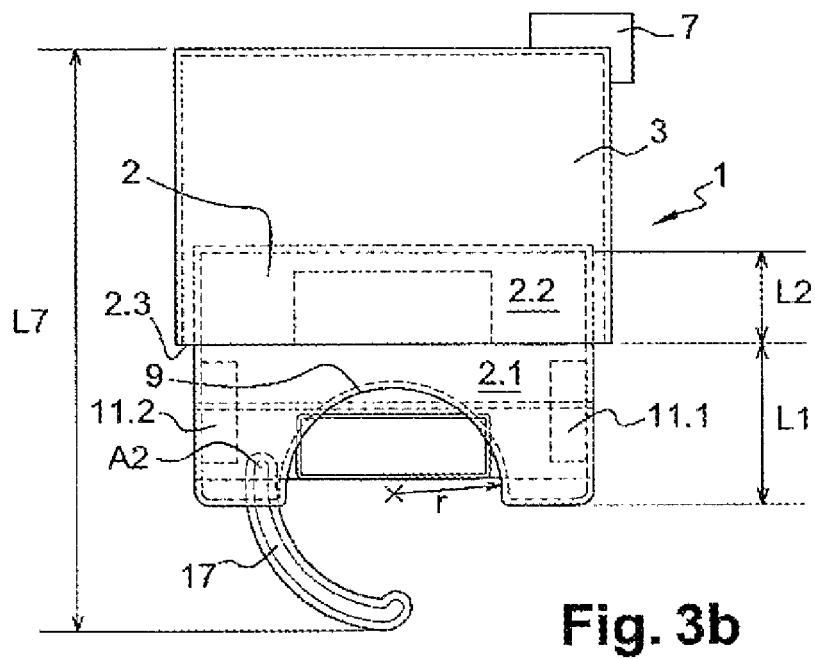

FIGS. 2 and 3 illustrate a cup holder 1 according to the invention comprising a drawer 2 which is capable of sliding in a sliding direction D inside a substantially parallelepipedal hollow body 3.

This drawer 2 is capable of moving from a closed position illustrated in FIG. 2 to an open position illustrated in FIG. 3. In the closed position, the drawer 2 is retracted inside the body 3. In the open position, the drawer 2 has a portion 2.1 which is extended from the body 3 and which is intended to receive a receptacle 6 and a portion 2.2 which is engaged in the body 3.

In accordance with the invention, the length L1 of the extended portion 2.1 (corresponding to the extension travel of the drawer 2) is less than the diameter of the cup 6 to be received, in particular this length L1 is less than the diameter of the smallest cup 6 which can be received. In one example, the smallest cup to be received is a cylindrical bottle which has a diameter of approximately 66 mm.

More precisely, the drawer 2, which extends in an extension plane 7, locally has an outer contour 9 in the form of a circular arc which is open outwards in the movement direction D. This contour 9 in the form of an open circular arc is intended to come into contact with a partial perimeter C1 of the cup 6 to be received. That is to say, the contour 9 is not intended to surround the cup 6 to be carried but instead to follow only a part of the outer contour C1 of this cup 6. In one example, the contour 9 locally has the shape of a semi-circle whose radius r is equal to that of the largest commercially available cups.

The cup holder 1 further comprises a substantially planar front 4 which extends in a direction perpendicular to D. This front 4 is connected to the drawer 2 so as to be able to be removed by means of two arms 11.1, 11.2. To this end, these connection arms 11.1, 11.2 each have an end connected to the front 4 and one end connected to one of the sides 13.1, 13.2 of the drawer 2 extending in the direction D. These two connection arms 11.1, 11.2 can be moved in rotation relative to the drawer 2 about an axis A1 which extends via the plane 7 and which is substantially perpendicular relative to the direction D.

Preferably, the front 4 has a surface 15 which is inclined relative to the extension surface of the front 4, the inclination angle of the surface 15 corresponding to the inclination angle of the arms 11.1, 11.2 relative to the drawer 2 when the drawer 2 is in the open position. This surface 15 allows the base of the cup 6 to rest in the flat state against the front 4.

Furthermore, the cup holder 1 comprises a retention arm 17 which can be moved in rotation relative to the drawer 2 about an axis A2 perpendicular to the plane of the drawer 2 which adapts to the size of the cup 6.

When the cup holder 1 is in the closed position, as illustrated in FIG. 2, the drawer 2 is retracted inside the body 3. The front 4 is flush with a side 2.3 of the drawer 2, the front 4 being close to and opposite the side 2.3, the arms 11.1, 11.2 extending in the direction D. The retention arm 13 is retracted towards the drawer 2.

When the cup holder 1 is in the open position, as illustrated in FIG. 3, the drawer 2 is partially extended from the body 3. The arms 11.1, 11.2 form with the drawer 2 an angle α of between, for example, 5 and 75°, α preferably being 60. The retention arm 13 is moved slightly away from the wall 9 in order to allow the cup to be positioned between the wall 9 and the arm 13.

A cup 6 which has a circumference C1 (illustrated with broken lines) can be placed on the inclined surface of the front 4 and between the retention arm 13 and the wall 9 in the form of a circular arc, the retention arm 13 adapting to the diameter of the receptacle 6 to be received so as to surround this cup 6.

When the drawer 2 moves from the closed position to the open position, the front 4 moves away from the drawer 2 in order to release the circular-arc-shaped opening of the drawer 2, the arms 11 moving out of the body 3 and rotating about the axis A1 in order to position the front 4 in the position illustrated in FIG. 3a, the retention arm 17 rotating about the axis A2 in order to become slightly released from the wall 9 of the drawer 2.

When the drawer 2 moves from the open position to the closed position, the body 3 applies a force to the connection arms 11.1, 11.2 so that the front 4 is turned down towards an end 2.3 of the drawer 2, the arms 11 rotating about the axis A1 so as to take up a substantially horizontal position and to position the front 4 opposite a side of the drawer 2, the retention arm 17 rotating about the axis A2 so as to become positioned against the wall 9, the drawer 2, and the arms 11 and 17 returning inside the body 3.

The movement from one position to another is preferably carried out using a system of the "push/push" type which allows the drawer 2 to be blocked inside the body 3 or allows the drawer 2 to be moved out of the body 3 by pushing the front 4 towards the body 3.

The movements of the front 4 and the retention arm 17 can be facilitated by the use of springs positioned in the articulations of the cup holder 1, these springs having a tendency in the idle state to push the arm 17 towards the drawer 2 and to move the arms 11.1, 11.2 away from the drawer 2.

According to one embodiment, the cup holder 1 comprises a body 2 which has a width L3 of approximately 106 mm, a length L4 of approximately 154 mm, and a thickness L5 of approximately 34 mm.

Furthermore, the distance L6 between the front 4 and an opposing end of the body 3 is approximately 125 mm. The distance L7 between the end of the retention arm 17 and the end of the opposing body 3 is approximately 208 mm.

The invention claimed is:
1. A cup holder (1) which is intended to receive a receptacle (6) of the cup type, comprising:
   a drawer (2); and
   a hollow body (3),
      the drawer (2) being slideable inside the body in a movement direction (D) in order to move from a closed position in which the drawer (2) is retracted inside the body (3) to an open position in which the drawer (2) is at least partially extended from the body (3) in order to receive the receptacle (6), the drawer being delimited toward said movement direction by a side (2.3), and
      the drawer (2) connected to a front (4), the front (4) extending in a first position along and at a same level as said side (2.3) of the drawer (2) when the drawer (2) is in the closed position, wherein, the drawer (2) locally has an outer contour (9) in the form of an open circular arc configured to come into contact with a partial perimeter (C1) of the receptacle (6), said outer contour defining an open recess in said side of the drawer that opens outward from a rear of the drawer, the front (4), in the first position, being located in front of an opening of the open recess and substantially enclosing the open recess, and the front (4) is retractable, the front (4) comprising means (11.1, 11.2) for moving downward with respect to the drawer from the first position to a second position when the drawer moves from the closed position to the open position, the front in the second position being located beneath the open recess and configured to support the base of the receptacle, the open recess being open toward the movement direction.

2. The cup holder according to claim 1, wherein the extension travel (L1) of the drawer (2) is less than the diameter of the smallest cup (6) which can be received.

3. The cup holder according to claim 2, further comprising:
a retention arm (17) rotatably moveable relative to the drawer (2) about an axis (A2) perpendicular relative to the plane (7) in which the drawer (2) extends in order to adapt the cup holder to the diameter of the receptacle (6) to be carried.

4. The cup holder according to claim 2, wherein the retention arm (17) substantially has a C-shape which complements the outer contour of the receptacle (6).

5. The cup holder according to claim 2, wherein the front (4) comprises at least one connection arm (11.1, 11.2) which connects the front (4) to the drawer (2), this connection arm (11.1, 11.2) being rotatably movable relative to the drawer (2) about an axis (A1) which is located in the plane (7) of the drawer and which is perpendicular relative to the movement direction (D) of the drawer.

6. The cup holder according to claim 2, wherein the contour (9) of the drawer (2) has a semi-circular shape.

7. The cup holder according to claim 1, further comprising:
a retention arm (17) rotatably moveable relative to the drawer (2) about an axis (A2) perpendicular relative to the plane (7) in which the drawer (2) extends in order to adapt the cup holder to the diameter of the receptacle (6) to be carried.

8. The cup holder according to claim 7, wherein the retention arm (17) substantially has a C-shape which complements the outer contour of the receptacle (6).

9. The cup holder according to claim 1, wherein the front (4) comprises at least one connection arm (11.1, 11.2) which connects the front (4) to the drawer (2), this connection arm (11.1, 11.2) being rotatably movable relative to the drawer (2) about an axis (A1) which is located in the plane (7) of the drawer and which is perpendicular relative to the movement direction (D) of the drawer.

10. The cup holder according to claim 9, wherein the front (4) comprises two connection arms (11.1, 11.2), these two connection arms each having an end which is connected to the front (4) and an end which is connected to one of the sides (13.1, 13.2) of the drawer (2) extending in the movement direction (D).

11. The cup holder according to claim 9, wherein the front (4) has a surface (15) which is inclined relative to the extension surface of the front (4) so that the base of the receptacle (6) rests in a flat state on the front (4).

12. The cup holder according to claim 11, wherein the inclination angle ($\alpha$) of the surface (15) corresponds to the inclination angle of the connection arm (11.1, 11.2) relative to the drawer (2) when the drawer (2) is in the open position.

13. The cup holder according to claim 1, wherein the contour (9) of the drawer (2) has a semi-circular shape.

14. The cup holder according to claim 1, wherein the front (4) has a surface (15) which is inclined relative to the extension surface of the front (4) so that the base of the receptacle (6) rests in a flat state on the front (4).

15. The cup holder according to claim 1, wherein the front has a substantially flat face facing toward the movement direction.

16. The cup holder according to claim 1, wherein the hollow body has an opening toward the outside, through which the drawer moves, the front in the first position extending parallel and close to the opening.

17. A cup holder configured to receive a cup-type receptacle (6), comprising:
a drawer (2); and
a hollow body (3),
the drawer (2) being slideable inside the body in a movement direction (D) in order to move from a closed position in which the drawer (2) is retracted inside the body (3) to an open position in which the drawer (2) is at least partially extended from the body (3) in order to receive the receptacle (6), and
the drawer (2) being connected to a front (4), the front (2) being flush with a side (2.3) of the drawer (2) when the drawer (2) is in the closed position,
wherein,
the drawer (2) locally has an outer contour (9) in the form of an open circular arc configured to come into contact with a partial perimeter (C1) of the receptacle (6),
the front (4) is retractable, the front (4) comprising means (11.1, 11.2) for becoming located in an inclined position relative to the drawer (2) when the drawer (2) is in the open position in order to support the base of the receptacle (6), and
the front (4) comprises two connection arms (11.1, 11.2) connecting the front (4) to the drawer (2), the connection arms being rotatably movable relative to the drawer (2) about an axis (A1) located in the plane (7) of the drawer and which is perpendicular relative to the movement direction (D) of the drawer, two connection arms each having an end which is connected to the front (4) and an end which is connected to one of the sides (13.1, 13.2) of the drawer (2) extending in the movement direction (D).

* * * * *